United States Patent Office 3,764,292
Patented Oct. 9, 1973

3,764,292
ORGANOTIN NITRILES AS SELECTIVE
HERBICIDES
Adolph J. Deinet, East Brunswick, N.J., assignor to
Tenneco Chemicals, Inc.
No Drawing. Application May 11, 1970, Ser. No. 36,381,
now Patent No. 3,683,089, dated Aug. 8, 1972, which
is a division of application Ser. No. 800,741, Feb. 19,
1969, now Patent No. 3,560,540, dated Feb. 2, 1971.
Divided and this application July 27, 1972, Ser. No.
275,810
Int. Cl. A01n 9/24
U.S. Cl. 71—97                                    4 Claims

ABSTRACT OF THE DISCLOSURE

Organotin compounds that have the structural formula

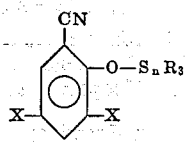

wherein each R represents an alkyl group having from 4 to 8 carbon atoms or a phenyl group; one of the X substituents represents halogen; and the other X substituent represents hydrogen or halogen are effective as selective herbicides.

---

This is a division of my copending patent application Ser. No. 36,381, which was filed on May 11, 1970, now Pat. No. 3,683,089 and which is a division of my patent application Ser. No. 800,741, which was filed on Feb. 19, 1969 and which is now U.S. Pat. No. 3,560,540.

This invention relates to a process for controlling the growth of plants. More particularly, it relates to the use of certain substituted phenoxy tin compounds as selective herbicides.

In accordance with this invention, it has been found that compounds that have the structural formula

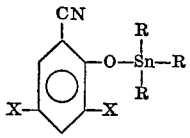

wherein each R represents an alkyl group having from 4 to 8 carbon atoms or a phenyl group; one of the X substituents represents chlorine, bromine, iodine, or fluorine; and the other X substituent represents hydrogen, chlorine, bromine, iodine, or fluorine, are valuable pre-emergence and postemergence selective herbicides.

Illustrative of these herbicidal compounds are the following:

tri-n-butyl (2-cyano-4-chlorophenoxy)tin;
tri-n-butyl (2-cyano-6-chlorophenoxy)tin;
tri-n-butyl (2-cyano-4,6-dichlorophenoxy)tin;
tri-n-butyl (2-cyano-4-bromophenoxy)tin;
tri-n-octyl (2-cyano-6-bromophenoxy)tin;
tri-n-octyl (2-cyano-4,6-diiodophenoxy)tin;
triphenyl (2-cyano-4,6-difluorophenoxy)tin;
triphenyl (2-cyano-4,6-dibromophenoxy)tin;
triphenyl (2-cyano-4-iodophenoxy)tin;
tri-2-ethylhexyl (2-cyano-4-fluorophenoxy)tin;
and the like.

The substituted phenoxytin compounds may be prepared by the reaction of the appropriate halogenated 2-hydroxybenzonitrile with a trialkyl tin hydroxide or triphenyl tin hydroxide in a hydrocarbon or ketone solvent or by the reaction of an alkali metal salt of a halogenated 2-hydroxybenzonitrile with a trialkyl tin chloride or triphenyl tin chloride in a suitable solvent.

The substituted phenoxy tin compounds may be used to inhibit or prevent the growth of a wide variety of plants. They may be applied to the locus in which plants are to be grown or they may be applied directly to the plants whose growth is to be controlled.

While the substituted phenoxy tin compounds may be used as such in the control of the growth of undesirable plants, they are usually and preferably used in combination with an inert carrier which facilitates the dispensing of dosage quantities of the compounds and assists in their absorption by the plants. The compounds may be mixed with or deposited upon inert particulate solids, such as fuller's earth, talc, diatomaceous earth, hydrated calcium silicate, kaolin, and the like to form dry particulate compositions. Such compositions may, if desired, be dispersed in water with or without the aid of surface-active agents. The herbicidal compounds are preferably dispensed in the form of solutions or dispersions in inert organic solvents, water or mixtures of inert organic solvents and water, or as oil-in-water emulsions. The concentrations of the active materials in the compositions may vary within wide limits and depends upon a number of factors, the most important of which are the type or types of plants being treated and the amount of the composition to be applied. If desired, mixtures of two or more of the herbicidal compounds as well as other pesticidal compounds may be present in the compositions.

The invention is further illustrated by the examples that follow.

EXAMPLE 1

To a solution of 18.8 grams (0.1 mole) of 2-hydroxy-3,5-dichlorobenzonitrile in 160 grams of methyl ethyl ketone was slowly added 11.4 grams (0.1 mole) of a 50 percent by weight solution of potassium hydroxide. To the resulting solution at 25°–30° C. was slowly added 32.4 grams (0.1 mole) of tri-n-butyl tin chloride. The reaction mixture was heated at its reflux temperature for two hours, cooled, and filtered. The filtrate was evaporated to dryness, and the residue was dissolved in 300 ml. of benzene. The benzene solution was washed three times with 150 ml. portions of water and then heated under vacuum to remove the benzene. There was obtained 45.7 grams (95.8 percent yield) of tri-n-butyl (2-cyano-4,6-dichlorophenoxy)tin, a yellow semi-crystalline material that contained 15.78 percent of chlorine and 24.37 percent of tin (calculated, 14.87% Cl and 24.9% Sn).

EXAMPLE 2

An acetone solution was prepared by dissolving 100 mg. of the product of Example 1 in 10 ml. of acetone that contained 2000 p.p.m. of sorbitan trioleate and 5000 p.p.m. of a polyoxyethylene ether of sorbitan monooleate. The acetone solution was dispersed in 90 ml. of distilled water to form an aqueous solution that contained 1000 p.p.m. of the organotin compound. More dilute solutions were prepared by adding distilled water to this solution.

EXAMPLE 3

A series of tests was carried out in which the product of Example 1 was evaluated as a selective herbicide. In the tests groups of greenhouse flats containing soil were planted with seeds of various crop plants and weeds. In the preemergence tests the soil after planting was sprayed with an aqueous solution prepared by the procedure of Example 2. In the postemergence tests the solution was applied two to four weeks after planting. The effectiveness of the treatment was determined by comparing the treated plants with untreated plants. In Table I a rating of 0 indicates no herbicidal activity; 1 to 3 indicates slight injury; 4 to 6 indicates moderate injury; 7 to 9 indicates severe injury; and 10 indicates destruction of all plants.

TABLE I

[Activity of tri-n-butyl (2-cyano-4,6-dichlorophenoxy)tin as a selective herbicide]

| Dosage (No./acre) | Preemergence | | | Postemergence | | |
|---|---|---|---|---|---|---|
| | 10 | 5 | 2.5 | 10 | 5 | 2.5 |
| Plant species: | | | | | | |
| Clover | 10 | 10 | 0 | 10 | 8 | 5 |
| Sugar beet | 0 | 0 | 0 | 6 | 5 | 5 |
| Soybean | 0 | 0 | 0 | 10 | 9 | 7 |
| Cotton | 0 | 0 | 0 | 10 | 10 | 10 |
| Corn | 3 | 0 | 0 | 6 | 6 | 4 |
| Oats | 3 | 0 | 0 | 7 | 5 | 4 |
| Mustard | 10 | 10 | 8 | 10 | 10 | 10 |
| Morning glory | 0 | 0 | 0 | 10 | 10 | 9 |
| Buckwheat | 4 | 0 | 0 | 10 | 10 | 10 |
| Crab grass | 10 | 0 | 0 | 7 | 5 | 3 |
| Rye grass | 8 | 0 | 0 | 9 | 7 | 0 |
| Foxtail | 9 | 0 | 0 | 8 | 5 | 2 |

Each of the other organotin compounds disclosed herein can also be used to control the growth of undesirable plants.

The terms and expressions that have been used are used as terms of description and not of limitation. There is no intention in the use of such terms and expressions of excluding any equivalents of the features shown and described or portions thereof. It is recognized that various modifications are possible within the scope of the invention claimed.

What is claimed is:

1. The process for the control of plant growth in a locus which comprises applying to the locus a phytotoxic amount of a herbicidal compound having the structural formula

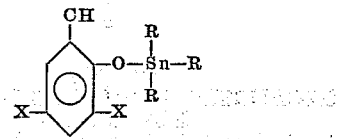

wherein each R represents an alkyl group having from 4 to 8 carbon atoms or a phenyl group; one of the X substituents represents halogen; and the other X substituent represents hydrogen or halogen.

2. The process of claim 1 wherein the herbicidal compound is tri-n-butyl (2-cyano-4,6-dichlorophenoxy)tin.

3. The process of claim 1 wherein the herbicidal compound is applied to the locus as a preemergence herbicide.

4. The process of claim 1 wherein the herbicidal compound is applied to the plants.

References Cited
UNITED STATES PATENTS

| 3,504,869 | 8/1970 | Minieri | 71—97 X |
| 3,499,086 | 3/1970 | Brueckner et al. | 71—97 X |
| 3,031,483 | 4/1962 | Koopmans et al. | 71—97 X |

LEWIS GOTTS, Primary Examiner

C. L. MILLS, Assistant Examiner